(12) United States Patent
Lapchuk et al.

(10) Patent No.: US 7,312,445 B2
(45) Date of Patent: Dec. 25, 2007

(54) PYRAMID-SHAPED NEAR FIELD PROBE USING SURFACE PLASMON WAVE

(75) Inventors: Anatoliy Lapchuk, Kyeonggi-do (KR); Ho Seop Jeong, Kyeonggi-do (KR); Dong Ik Shin, Kyeonggi-do (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 185 days.

(21) Appl. No.: 11/105,669

(22) Filed: Apr. 13, 2005

(65) Prior Publication Data

US 2006/0076474 A1    Apr. 13, 2006

(30) Foreign Application Priority Data

Oct. 11, 2004    (KR)    ............ 10-2004-0080876

(51) Int. Cl.
*G01B 11/00*    (2006.01)
(52) U.S. Cl. .................................... 250/306; 369/13.33
(58) Field of Classification Search ................ 250/234, 250/306, 307; 369/126, 13.33; 385/15, 385/146
See application file for complete search history.

(56) References Cited

U.S. PATENT DOCUMENTS 5,354,985 A * 10/1994 Quate ................ 250/234
6,201,226 B1 * 3/2001 Shimada ................ 250/201.3
6,333,497 B2 * 12/2001 Shimada ................ 250/201.3
6,886,238 B2 * 5/2005 Song ........................ 29/603.07

OTHER PUBLICATIONS

Korean Patent Abstracts for 1020030044141 A published on Jun. 9, 2003.

* cited by examiner

*Primary Examiner*—Georgia Epps
*Assistant Examiner*—Tony Ko
(74) *Attorney, Agent, or Firm*—Darby & Darby P.C.

(57) ABSTRACT

Disclosed herein is a pyramid-shaped near field probe which forms and changes a near field at the aperture of the probe. The pyramid-shaped near field probe of the present invention includes a probe body and metal films. The probe body is constructed in the form of a pyramid using a semiconductor process using a dielectric member and receives an electromagnetic wave. The metal films are symmetrically coated on two predetermined sides of four sides of the probe body while being spaced apart from each other. The pyramid-shaped near field probe allows a surface plasmon wave induced on the surfaces of the metal films due to the electromagnetic wave to progress to the aperture of the probe body through the boundary surface between the probe body and the metal films.

8 Claims, 6 Drawing Sheets

PYRAMID-SHAPED NEAR FIELD PROBE USING SURFACE PLASMON WAVE

INCORPORATION BY REFERENCE

The present application claims priority under 35 U.S.C. §119 to Korean Patent Application No. 2004-80876 filed on Oct. 11, 2004. The content of the application is incorporated herein by reference in its entirety.

BACKGROUND OF THE INVENTION

1. Field of the Invention

The present invention relates, in general, to pyramid-shaped near field probes using surface plasmon waves and, more particularly, to a near field probe, which forms and changes a near field at the aperture of the probe using a surface plasmon wave propagating through the boundary surface between a probe body made of a dielectric and metal films symmetrically coated on the sides of the probe body.

2. Description of the Related Art

Generally, in order to store a greater amount of information per unit area in an optical information storage device, the wavelength of a recording light source must be reduced or the numerical aperture of a condensing lens must be increased. In the case of wavelength, a blue laser diode may be developed, and in the case of numerical aperture, a maximum of 1.0 may be obtained.

However, such an optical information storage scheme is limited in recording high density information in an advanced information storage device requiring high density recording due to the refractive limit of light, etc.

For alternative technology for overcoming the above limitation, Scanning Probe Recording (SPR) technology using the probe of an Atomic Force Microscope (AFM), super resolution media technology, technology using a near field probe overcoming the refractive limit of light, etc. have been developed. In particular, a near field probe using an optical fiber has been developed.

With reference to FIGS. 1 to 5, the construction and operation of a near field probe using an optical fiber is described.

As shown in FIGS. 1 and 2, an optical fiber 10 used for a near field probe includes a core 11 for guiding externally incident light, and a cladding 12 surrounding the core 11 to protect the core 11.

In this case, the core 11 is made of quartz glass with a diameter of 10 μm and plastic material, and the cladding 12 is made of glass material having a refractive index differing from that of the core 11.

A process of forming a probe on the optical fiber 10 having the above construction is described below.

As shown in FIG. 3, after one end of the core 11, not heated, is firmly held using a mechanism while heat is applied to the other end thereof at a certain temperature or above and the other end is heated, the heated portion is pulled using a mechanism, so that a conical optical fiber 14 having an aperture 13 is formed.

In this case, the aperture 13 is preferably formed to cause the diameter thereof to be about 0.05 to 0.3 μm. If the aperture 13 is formed in this way, the size of a near field formed at the aperture 13 due to the light transmitted through the conical optical fiber 14 is about 100 nm or less.

As described above, after the conical optical fiber 14 is formed through a pulling process, a metal, such as aluminum, is coated to form a metal layer 15 on an external surface of the conical optical fiber 14 as shown in FIG. 4, so that an optical fiber probe 16 using the optical fiber is completely produced.

However, the above-described optical fiber probe 16 using the optical fiber is disadvantageous in that, if a traveling wave 20 propagates into the conical optical fiber 14 and reaches a region near a diameter having a size similar to the wavelength of the traveling wave while propagating into the optical fiber 14, as shown in FIG. 5, the progression of light is difficult, so that the intensity of the traveling wave 20 decreases sharply.

At this time, in order to obtain the information on spatial resolution below the wavelength, the diameter of the aperture 13 of the optical fiber probe 16 must be smaller than the wavelength of the traveling wave 20. Therefore, as the traveling wave 20 approaches the aperture 13, the traveling wave 20 almost disappears, and only an evanescent wave 21, losing traveling characteristics, exists in the region of the aperture 13 of the optical fiber probe 16.

At this time, the intensity of the evanescent wave 21 existing near the aperture 13 of the optical fiber probe 16 decreases to 0.01% or less of the intensity of incident light. For a method of solving the above disadvantage, a metal film functioning to allow light with a size below the refractive limit to pass through the optical fiber 14 as well as to prevent light guided through the conical optical fiber 14 from leaking to the outside is coated on the external surface of the optical fiber 14.

However, since the optical fiber probe using an optical fiber constructed as described above has extremely low transmissivity, it has limitations in Signal-to-Noise (S/N) ratio and recording and reproducing speed, so that the optical fiber probe causes a great number of problems when it is used for a high density optical recording apparatus.

Further, the above-described optical fiber probe using an optical fiber is problematic in that, since light guided to the aperture region is basically formed to have multiple modes, such as traverse magnetic modes $TM_{00}$, $TM_{10}$ and $TM_{20}$, it is difficult to form a sharp beam spot on the aperture.

Further, the optical fiber probe using an optical fiber is problematic in that, since it is manufactured in such a way that, after heat processing is executed for the optical fiber, a conical optical fiber is formed by a pulling operation, and a metal film is coated on the conical optical fiber, it is difficult to structurally manufacture the optical fiber probe.

SUMMARY OF THE INVENTION

Accordingly, the present invention has been made keeping in mind the above problems occurring in the prior art, and an object of the present invention is to provide a pyramid-shaped near field probe, which propagates a surface plasmon wave through metal films symmetrically coated on sides of a pyramid-shaped probe body, thus forming a near field at the aperture of the probe.

In order to accomplish the above object, the present invention provides a pyramid-shaped near field probe using a surface plasmon wave, comprising a dielectric member formed in a pyramid shape to receive an electromagnetic wave; and metal films symmetrically coated on two predetermined sides of four sides of the dielectric member while being spaced apart from each other, wherein the probe allows a surface plasmon wave induced on surfaces of the metal films due to the electromagnetic wave to progress to a region of an aperture of the dielectric member through a boundary surface between the dielectric member and the metal films.

In this case, the present invention allows only a waveguide mode of $TM_{00}$ to exist at the aperture of the dielectric member by eliminating the end of any one of the metal films that are symmetrically coated on two predetermined sides of four sides of the dielectric member while being spaced apart from each other.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
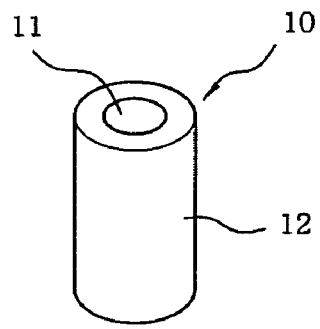
FIG. 1 is a perspective view showing an optical fiber used for a conventional optical fiber probe.
Figure 2:
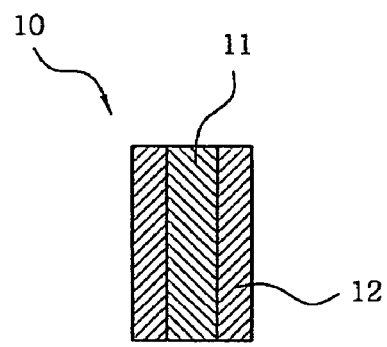
FIG. 2 is a sectional view showing the optical fiber used for the conventional optical fiber probe.
Figure 3:
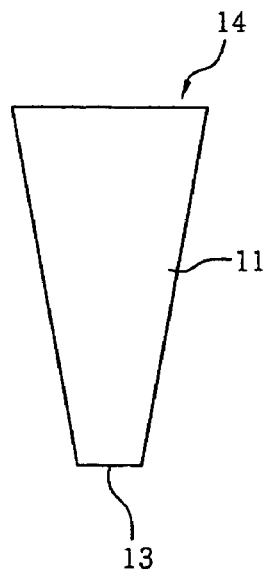
FIG. 3 is a side view showing an optical fiber probe formed by a pulling process for an optical fiber.
Figure 4:
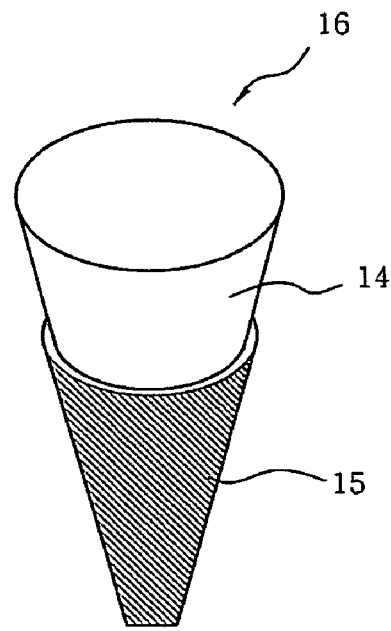
FIG. 4 is a perspective view of a conventional optical fiber probe on which a metal film is coated to prevent the attenuation of an optical signal propagating through an optical fiber.
Figure 5:
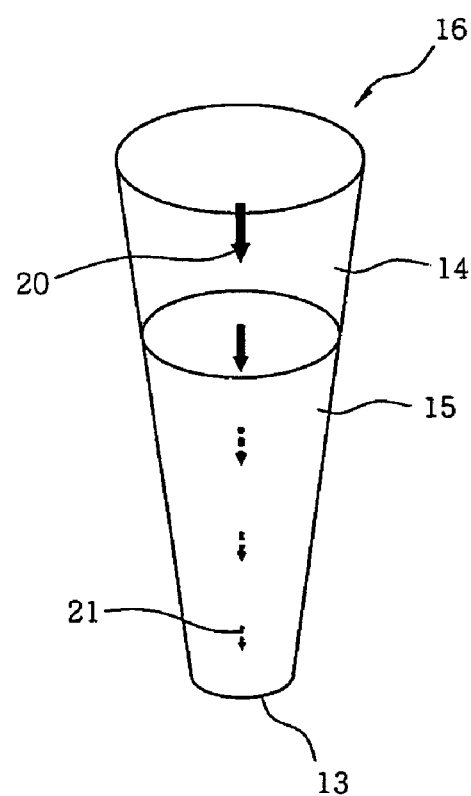
FIG. 5 is a perspective view of a conventional optical fiber probe to show the change in a traveling wave that propagates through the optical fiber probe.

Hereinafter, embodiments of the present invention will be described in detail with reference to the attached drawings. Reference now should be made to the drawings, in which the same reference numerals are used throughout the different drawings to designate the same or similar components.

Figure 6:
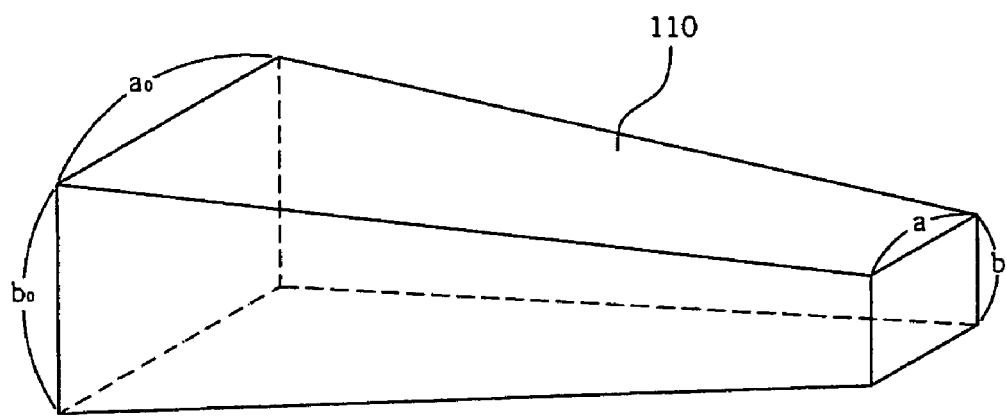
FIG. 6 is a perspective view showing the construction of a pyramid-shaped probe body formed by a semiconductor process according to the present invention.
Figure 7:
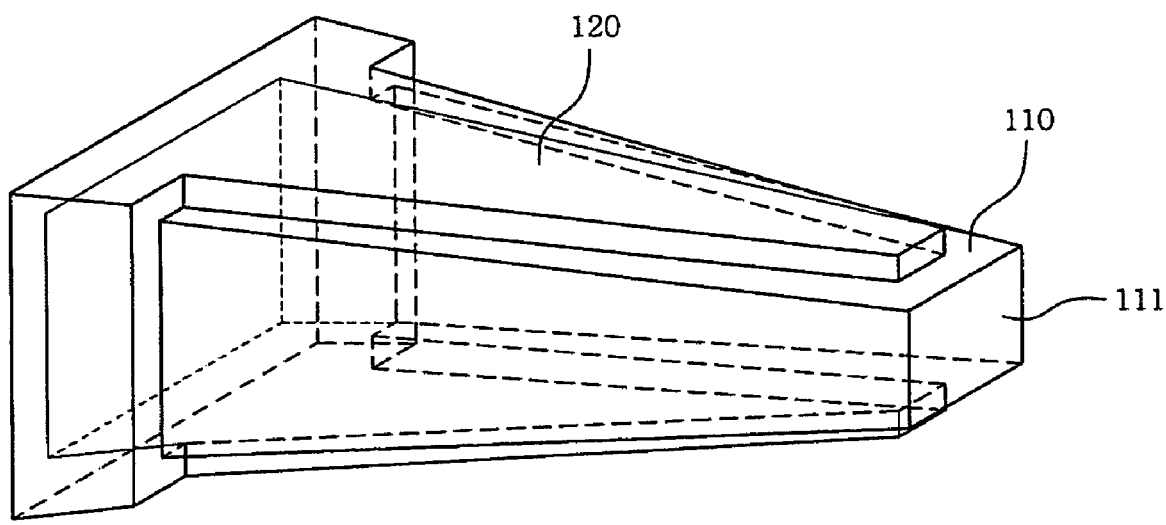
FIG. 7 is a perspective view showing the construction of a pyramid-shaped near field probe according to an embodiment of the present invention.
Figure 8:
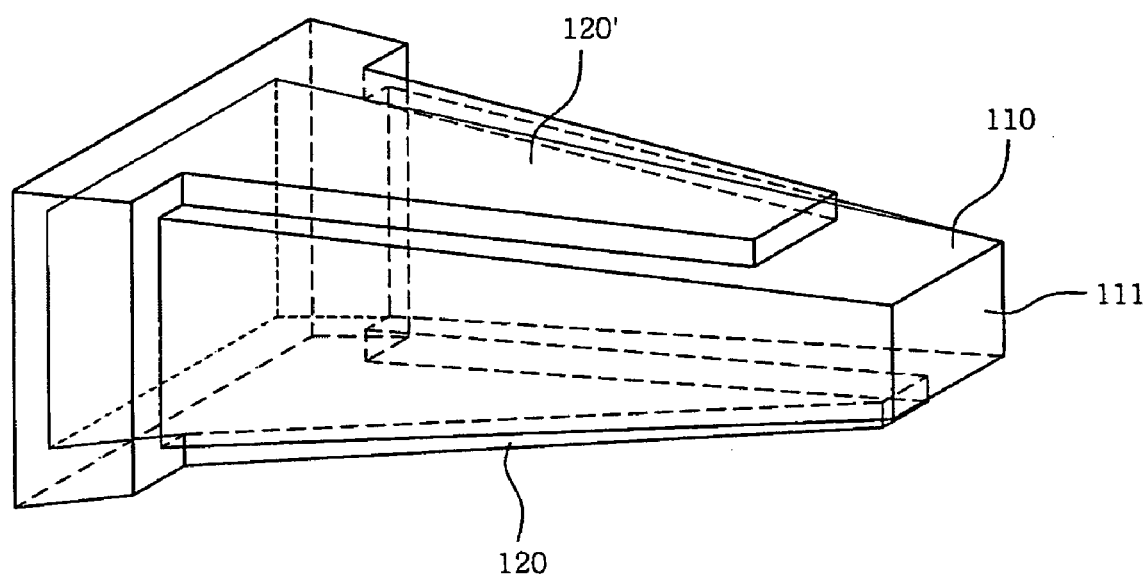
FIG. 8 is a perspective view showing the construction of a pyramid-shaped near field probe in which an end of a metal film is cut according to another embodiment of the present invention.

With reference to FIGS. 6 to 8, the construction and manufacturing process of a pyramid-shaped near field probe according to the present invention are described in detail.

The near field probe of the present invention allows a surface plasmon wave to propagate to the end of the probe through metal films symmetrically coated on the sides of a pyramid-shaped probe body, thus forming a near field. As shown in FIGS. 6 to 8, the pyramid-shaped near field probe includes a pyramid-shaped probe body 110 and metal films 120.

The probe body 110, which functions to guide electromagnetic waves that are incident from an external light source and include predetermined waveguide modes, for example, $TM_{00}$, $TM_{10}$ and $TM_{20}$ modes, is constructed in the form of a pyramid having both ends open and rectangular, by a semiconductor process using a predetermined dielectric member.

In order to store a greater amount of information per unit area in a predetermined optical information storage device, only an electromagnetic wave having a waveguide mode of $TM_{00}$ must be output to the region of the aperture 111 of the probe body 110. For this operation, the electromagnetic wave having an electric field smaller than the diameter of one end of the probe body 110 is allowed to be incident on the probe body 110, thus enabling only the electromagnetic wave having a waveguide mode of $TM_{00}$ to be output to the region of the aperture 111 of the probe body 110.

However, if an electromagnetic wave having an electric field greater than the diameter of one end of the probe body 110, on which the electromagnetic wave is incident, the electromagnetic wave having a waveguide mode of $TM_{20}$ is output to the aperture region 111 of the probe body 110. However, if the electromagnetic wave having a waveguide mode of $TM_{20}$ does not coincide with the center of one end of the probe body 110, an electromagnetic wave having a waveguide mode of $TM_{20}$ is output to the aperture region 111.

In this case, as shown in FIG. 6, the pyramid-shaped probe body 110 according to the present invention is constructed so that the aspect ratio a0×b0 of one end on which an electromagnetic wave is incident is greater than the aspect ratio a×b of the other end thereof at which a near field is formed. Accordingly, the probe body 110 is formed in a shape in which the width of each side narrows toward the aperture 111 of the probe body 110.

At this time, the aspect ratio a0×b0 of one end of the probe body 110 on which electromagnetic waves are incident is set to have an area greater than the distribution of the electric field of the electromagnetic waves so as to allow only an electromagnetic field having a waveguide mode of $TM_{00}$ to be output from the region of the aperture 111. In this case, the aspect ratio a0×b0 of one end is set to 400 nm×400 nm, while the aspect ratio a×b of the other end is set to 40 nm×40 nm.

Figure 10A:
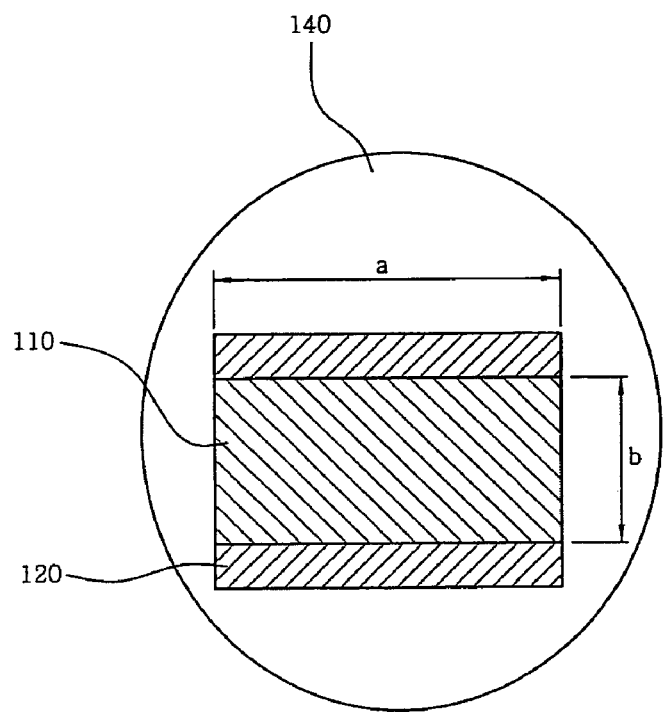
FIGS. 10a and 10b are views showing the shape of a beam spot formed in the aperture region of the pyramid-shaped near field probe according to the present invention.
Figure 10B:
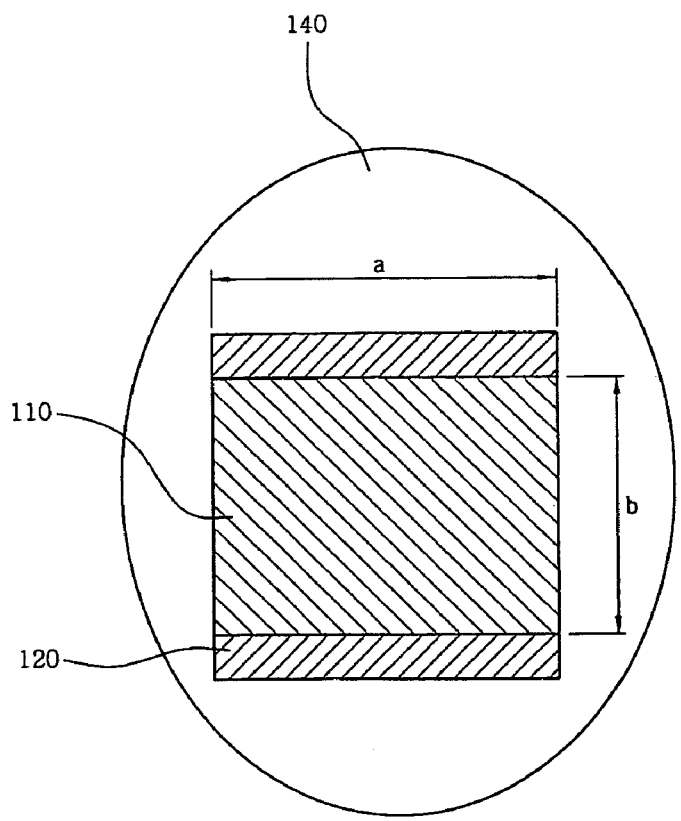

Therefore, as shown in FIGS. 10a and 10b, the diameter of a beam spot 140 formed in the region of the aperture 111 of the probe body 110 is proportional to the total area obtained by adding the area of the aperture (its aspect ratio is a×b) to the area of the metal films symmetrically formed on both sides of the aperture. Therefore, the diameter of the beam spot 140 formed in the region of the aperture 111 is about 40 nm depending on the total area.

Further, the probe body 110 is made of a glass-related dielectric member. When the electromagnetic waves are incident on the metal films 120 symmetrically formed on both sides of the probe body 110 through the probe body 110, conditions allowing a surface plasmon wave to propagate through the boundary surface between the probe body 110 and the metal films 120 are satisfied.

The metal films 120 function to allow a surface plasmon wave formed by the oscillation of charged particles excited on the surface thereof in association with incident electromagnetic waves to propagate in a direction of the aperture 111 of the probe body 110. As shown in FIG. 7, the metal films 120 are coated on two predetermined surfaces of four surfaces of the probe body 110 in a thickness of about 15 nm while being spaced apart from each other.

In this case, the metal films 120 are symmetrically formed on two sides of the probe body 110 to allow the area of each metal film to be smaller than that of each side of the probe body in such a way that a conductive material, such as gold, silver or aluminum, is coated to surround four sides of the pyramid-shaped probe body 110, and an etching process is carried out with respect to the coated conductive material.

In this case, the metal films 120 symmetrically formed on two sides of the probe body 110 are constructed to have a shape narrowing toward the aperture 111 of the probe body 110 due to the structural characteristics of the probe body 110, as shown in FIG. 7.

Thereafter, the metal films 120 coated on the remaining two sides of the probe body 110, in detail, the metal films 120 coated over the range from a location, spaced apart from one end of the probe body 110 on which electromagnetic waves are incident, to the other end of the probe body 110, are eliminated through an etching process.

The metal films 120 formed by the above-described process are symmetrically coated on two sides of the probe body 110 while being spaced apart from each other. Thereafter, if the surface plasmon wave propagates through the surfaces of the metal films 120, a predetermined potential difference is generated between the metal films 120.

Therefore, the S/N ratio can be greatly improved by increasing the surface plasmon wave propagating to the aperture 111 of the probe body 110 due to the potential difference generated between the metal films 120.

At this time, the surface plasmon wave is characterized in that it propagates only through the surfaces of the metal films 120, not to the inside or outside from the surface of the metal films 120.

Further, in order to form only a waveguide mode of $TM_{00}$ in the region of the aperture 111 of the probe body 110, an end of any one metal film 120' of the metal films 120 may be eliminated from the region of the aperture 111 of the probe body 110, as shown in FIG. 8.

That is, any one metal film 120' of the symmetrically coated metal films 120 is formed on one side of the probe body 110 with the end thereof being eliminated from the aperture region of the probe body 110, and the remaining metal film 120 is coated to the region of the aperture 111 of the probe body 110.

Figure 9:
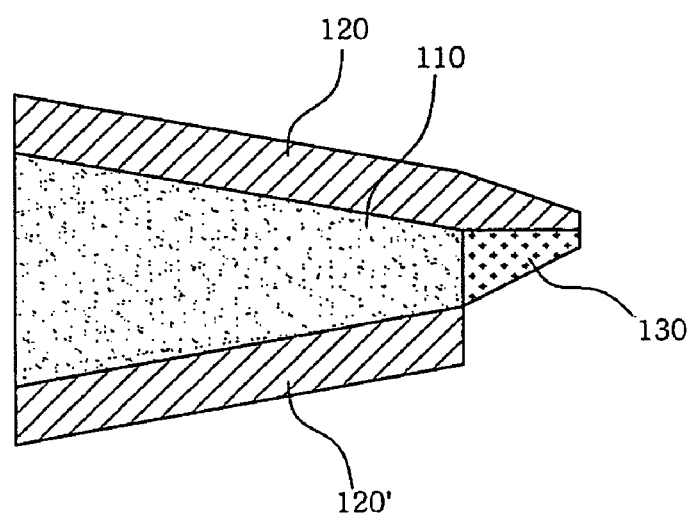
FIG. 9 is a sectional view showing the construction of a pyramid-shaped near-field probe in which an end of a metal film is cut according to a further embodiment of the present invention.

At this time, since the metal film 120, coated to the region of the aperture 111 of the probe body 110, propagates the surface plasmon wave to form a near field in the region of the aperture 111 of the probe body 110, a probe area corresponding to the eliminated metal film 120' may be eliminated, as shown in FIGS. 10a and 10b, or the probe area can be replaced and formed by air or another dielectric medium 130 as shown in FIG. 9.

Therefore, the metal films 120, coated to the region of the aperture 111 of the probe body 110, function as an aperture for guiding the surface plasmon wave, so that the surface plasmon wave propagates to the region of the aperture 111 of the probe body 110, thus forming or changing a near field.

As described above, if the end of one of the metal films 120 is eliminated, there is a disadvantage in that the surface plasmon wave propagates only in one direction and energy transmitted through the metal film 120 decreases by half, but there is a unique advantage in that only a waveguide mode $TM_{00}$ is formed in the region of the aperture 111 of the probe body 110.

Further, the diameter of the beam spot 140 formed in the region of the aperture 111 of the probe body 110 is proportional to the total area obtained by adding the area of the aperture 111 (its aspect ratio is a×b) to the area of the metal film formed on one side of the aperture 111. Accordingly, a beam spot 140 formed in the region of the aperture 111 depending on the total area has a diameter smaller than that of the beam spot 140 shown in FIGS. 10a and 10b, in detail, a diameter of about 30 nm.

Hereinafter, with reference to FIGS. 10a and 10b, an optical recording and reproducing process using a pyramid-shaped near field probe according to the present invention is described.

Figure 11:
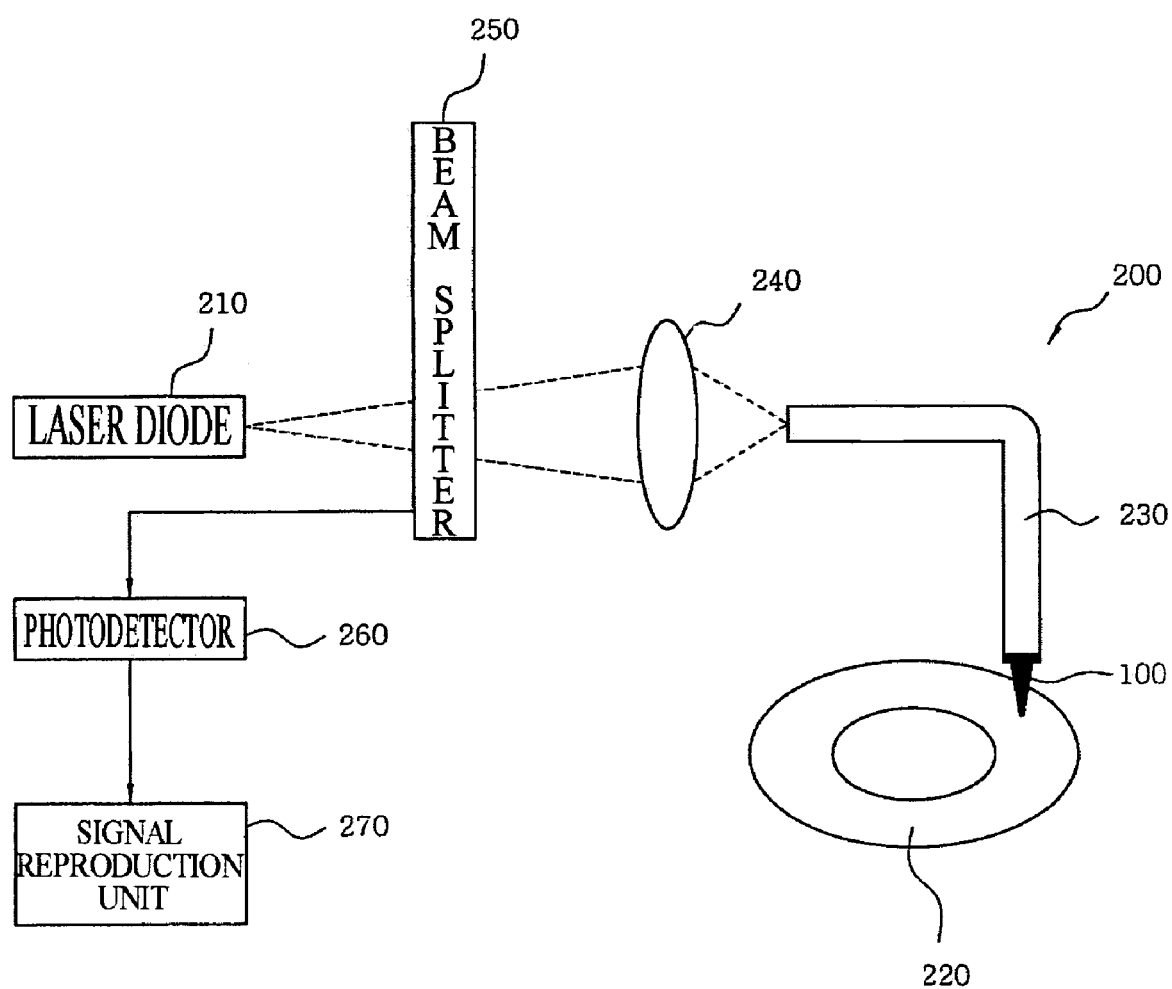
FIG. 11 is a view showing the construction of an optical information recording and reproducing apparatus to which the pyramid-shaped near field probe of the present invention is applied.

Referring to FIG. 11, an optical information recording and reproducing apparatus 200 includes a laser diode 210 for emitting laser light, an optical disc 220 for recording data using an optical signal, an optical fiber 230 for guiding the laser light emitted from the laser diode 210, a pyramid-shaped near field probe 100 for condensing the light guided through the optical fiber 230 and irradiating the condensed light on the optical disc 220, and a lens 240 for condensing the laser light emitted from the laser diode 210 and irradiating the condensed light onto the optical fiber 230.

Further, the optical information recording and reproducing apparatus 200 to which the present invention is applied includes a beam splitter 250 for splitting light that is reflected in the direction of the pyramid-shaped near field probe 100 by the optical disc 220 and guided through the optical fiber 230, a photodetector 260 for converting an optical signal split by the beam splitter 250 into a current signal, and a signal reproduction unit 270 for reproducing data recorded on the optical disc 220 using the current signal detected by the photodetector 260.

In this case, the lens 240 is implemented in the form of a convex lens for condensing the laser light emitted from the laser diode 210 on the optical fiber 230.

Further, the photodetector 260 is implemented with a photo diode for converting an optical signal into a current signal.

The operation of the optical information recording and reproducing apparatus having the above construction is described in detail.

First, a process of recording information on the optical disc 220 using an optical signal is described.

If laser light, a kind of electromagnetic wave to record information on the optical disc 220, is emitted from the laser diode 210, the laser light is condensed on the optical fiber 230 through the lens 240.

In this way, the laser light condensed by the lens 240 is guided through the optical fiber 230 and propagates up to the pyramid-shaped near field probe 100.

At this time, charged particles vibrate on the surfaces of the metal films 120, forming the pyramid-shaped near field probe 100, in association with the incident laser light, so that a surface plasmon wave propagating through the surfaces of the metal films 120 is formed.

The surface plasmon wave formed by the above-described principles propagates to the region of the aperture 111 of the probe body 110 through the boundary surface between the probe body 110 and the metal films 120 that are symmetrically formed on both sides of the probe body 110 while being spaced apart from each other, thus influencing the near field formed in the region of the aperture 111 of the probe body 110.

In this case, when the surface plasmon wave propagates through the surfaces of the metal films 120, a predetermined potential difference is generated between the metal films 120, so that the surface plasmon wave propagating to the region of the aperture 111 of the probe body 110 increases, thus remarkably improving the S/N ratio.

As described above, the near field formed in the region of the aperture 111 of the pyramid-shaped near-field probe 100 is used to record data on the optical disc 220. In this case, light forming the near field is irradiated to apply deformation to the optical disc 220, thus recording data.

Since the data are recorded on the optical disc 220 through the above-described process, it is easier to apply deformation to the optical disc 220 and record data thereon as the amount of light transmitted through the pyramid-shaped near field probe 100 increases. The reason for this is that, as the intensity of light forming the near field increases, the optical disc 220 is more easily deformed.

Further, since the width of the deformation on the optical disc 220 is determined in proportion to the size of the diameter of light forming the near field, the amount of data to be recorded on the optical disc 220 is determined depending on the diameter of the near field formed in the region of the aperture 111 of the pyramid-shaped near field probe body 110.

Therefore, in order to rapidly record a greater amount of data on the optical disc 220, the present invention proposes the technology of increasing transmissivity while minimizing the diameter of the aperture 111 of the pyramid-shaped near field probe 100.

Next, a process of reading information recorded on the optical disc 220 through the above process is described.

If laser light is irradiated onto the optical disc 220 with various pieces of information recorded thereon as described above, the light irradiated onto the optical disc 220 is reflected in the direction of the pyramid-shaped near field probe 100 and transmitted to the lens 240 through the optical fiber 230.

In this case, the light guided through the optical fiber 230 is condensed by the lens 240 and irradiated onto the beam splitter 250.

Further, when the beam splitter 250 splits the light irradiated by the lens 240 and transmits the split light to the photodetector 260, the photodetector 260 detects an optical signal split by the beam splitter 250, converts the optical signal into a current signal, and outputs the current signal to the signal reproduction unit 270.

The signal reproduction unit 270 reproduces data recorded on the optical disc 220 using the current signal converted by the photodetector 260 through the following process.

On the optical disc 220, portions, to which deformation is applied and is not applied, exist to record data, so that the intensities of light reflected by the two portions are different from each other. Accordingly, the intensity of a current signal detected by the photodetector 260 is also determined in proportion to the intensity of light reflected by the optical disc 220.

As described above, since a difference is generated between the intensities of current signals detected by the photodetector 260, the signal reproduction unit 270 compares the intensity of the current signal converted by the photodetector 260 with the intensity of a preset reference signal, thus reproducing the information recorded on the optical disc 220.

For example, if the current signal is greater than the reference signal, the signal reproduction unit 270 recognizes the current signal as "1", while if the current signal is less than the reference signal, the signal reproduction unit 270 recognizes the current signal as "0", thereby reproducing the information recorded on the optical disc 220 in the form of a digital character.

As described above, the recorded data are read by allowing the light transmitted through the pyramid-shaped near field probe 100 to be reflected by the optical disc 220. Accordingly, it is easier to reproduce recorded information as the intensity of light reflected by the optical disc 220 increases. In this case, the intensity of light reflected by the optical disc 220 is proportional to the intensity of light transmitted through the pyramid-shaped near field probe 100.

Therefore, the present invention proposes the technology of increasing the transmissivity of the pyramid-shaped near field probe 100 to rapidly and precisely reproduce the information recorded on the optical disc 220.

As described above, the present invention provides a pyramid-shaped near field probe, which allows a surface plasmon wave to propagate to the end of the probe through the metal films formed on both sides of the pyramid-shaped probe body to form a near field, so that optical efficiency increases at the end of the probe, thus improving a Signal-to-Noise (S/N) ratio, and shortening the time required to reproduce and record data.

Further, the present invention is advantageous in that the pyramid-shaped near field probe is manufactured through a semiconductor process, thus simplifying the manufacturing process of the probe and improving the productivity thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A near field probe, comprising:
   a dielectric member formed in a pyramid shape having an aperture to receive an electromagnetic wave; and
   metal films symmetrically coated on two predetermined sides of the dielectric member while being spaced apart from each other,
   wherein said probe is operable to allow a surface plasmon wave induced on surfaces of the metal films to propagate to the aperture through boundary surfaces between the dielectric member and the metal films.

2. The near field probe according to claim 1, wherein the metal films are formed having an area smaller than the sides of the dielectric member.

3. The near field probe according to claim 1, wherein at least one of the metal film ends are eliminated from an aperture region of the dielectric member.

4. The near field probe according to claim 3, wherein the aperture region of the dielectric member is designed to allow only a waveguide mode of TM00 to be formed therein by a surface plasmon wave propagating through the metal film.

5. The near field probe according to claim 3, wherein the metal film end is eliminated by an etching process.

6. The near field probe according to claim 1, wherein the dielectric member is at least one of a glass and a glass-related member.

7. The near field probe according to claim 1, wherein the metal films symmetrically coated on the two sides of the dielectric member are conductive materials.

8. The near field probe according to claim 1, wherein the symmetrically coated metal films cause a potential difference therebetween when a surface plasmon wave propagates to the aperture region of the dielectric member through a boundary surface between the dielectric member and the metal films.

* * * * *